(12) United States Patent
Winton et al.

(10) Patent No.: US 10,137,919 B2
(45) Date of Patent: Nov. 27, 2018

(54) CLIP-ON SMARTPHONE HOLDER FOR A CART

(71) Applicants: Herschel B. Winton, Saint Augustine, FL (US); Denise Joy Winton, Saint Augustine, FL (US)

(72) Inventors: Herschel B. Winton, Saint Augustine, FL (US); Denise Joy Winton, Saint Augustine, FL (US)

(73) Assignee: Cart Phone Caddy, LLC, Saint Augustine, FL (US)

( * ) Notice: Subject to any disclaimer, the term of this patent is extended or adjusted under 35 U.S.C. 154(b) by 0 days.

(21) Appl. No.: 15/607,589

(22) Filed: May 29, 2017

(65) Prior Publication Data

US 2017/0349200 A1 Dec. 7, 2017

Related U.S. Application Data

(60) Provisional application No. 62/344,519, filed on Jun. 2, 2016.

(51) Int. Cl.
*B62B 3/00* (2006.01)
*B62B 3/14* (2006.01)

(52) U.S. Cl.
CPC .............. *B62B 3/1472* (2013.01); *B62B 3/00* (2013.01); *B62B 3/1428* (2013.01); *B62B 3/14* (2013.01); *B62B 2202/56* (2013.01)

(58) Field of Classification Search
CPC ..... B62B 3/142; B62B 3/1412; B62B 3/1416; B62B 3/1424; B62B 3/1428; B60R 11/02
See application file for complete search history.

(56) References Cited

U.S. PATENT DOCUMENTS

2016/0107668 A1* 4/2016 Robins .................. B62B 3/1472
 224/411
2016/0183393 A1* 6/2016 Groom .................... A45C 11/00
 280/33.992

* cited by examiner

*Primary Examiner* — Bryan A Evans
(74) *Attorney, Agent, or Firm* — Mark Young, P.A.

(57) ABSTRACT

A mobile phone holder is mounted to a seat back or a similar support surface of a shopping cart. The holder is a generally S-shaped clip with one bend (a mounting bend) that engages the top edge of a panel of a shopping cart and another bend (a holding bend) that receives an object to be held, such as a phone. A cutout window reveals the microphone of the held phone and/or control or home button. A back of an intermediate panel includes a horizontal flange to maintain the holder at a viewing angle relative to the seat back.

17 Claims, 9 Drawing Sheets

CLIP-ON SMARTPHONE HOLDER FOR A CART

RELATED APPLICATION

This application is a nonprovisional of and claims the benefit of priority of U.S. provisional patent application 62/344,519 filed Jun. 2, 2016, the entire contents of which are incorporated herein by this reference.

FIELD OF THE INVENTION

This invention relates generally to device holders for a cart, and, more particularly, to a holder that is suitable for mounting to the seat back of a shopping cart and holding a device such as a phone in a visible and usable manner.

BACKGROUND

Using an electronic device, such a smart phone or tablet computing device, while shopping can be advantageous. For example, grocery lists, promotions and electronic coupons may be maintained and displayed on smart phones. Unfortunately, however, adequate means for securing such devices to a shopping cart have not seen widespread commercially deployment. Thus, a shopper using such a device must either hold the device or place it in the cart, from which it can fall or become buried, scratched or seriously damaged.

A wide range of holders have been developed for securing cell phones and personal digital assistants in cars. Typically, each holder is configured to hold a particular size device in a particular orientation using an attachment specifically adapted to connect to accessories of a car. Such conventional holders are not configured for mounting to a shopping cart, much less hold the device in a manner that maintains visibility and utility.

The invention is directed to overcoming one or more of the problems and solving one or more of the needs as set forth above.

SUMMARY OF THE INVENTION

To solve one or more of the problems set forth above, in an exemplary implementation of the invention, a holder that is suitable for mounting to the seat back or a similar support surface of a shopping cart is provided. The device generally comprises an S-shaped clip with one bend (a mounting bend) that engages the top edge of a seat back or similar panel of a shopping cart and another bend (a holding bend) that receives an object to be held, such as a phone. The clip is preferably comprised of rigid yet flexible plastic. The holding bend includes a cutout window to reveal the microphone and/or control or home button of a mobile phone held upright. An intermediate panel extends from the holding bend to the mounting bend. The back of the intermediate panel includes a horizontal flange to maintain the holder at a viewing angle relative to the seat back.

An electronic device holder according to principles of the invention is mountable on a shopping cart, such as a seat back of a shopping cart. The electronic device holder includes a generally S-shaped clip with a front bend disposed between a front panel and an intermediate panel. The front bend has a front bend radius and is at least a 180° bend and less than a 270° bend. The front panel is angled towards the intermediate panel by the front bend. The front panel extends upwardly from the front bend by a front panel length (height). The intermediate panel extends from the front bend to a mounting bend at an intermediate panel length (height). The intermediate panel length is greater than the front panel length. The front panel is generally elastically deflectable away from the intermediate panel to provide at least a ¼-inch space between the front panel and the intermediate panel. The mounting bend has a mounting bend radius and is at least a 180° bend and less than a 270° bend. A back panel extends downwardly from the mounting bend. The back panel is angled toward the intermediate panel by the mounting bend. The intermediate panel is disposed between the back panel and the front panel and between the front bend and the mounting bend. The back panel is generally elastically deflectable away from the intermediate panel to provide at least a ¼-inch space between the back panel and the intermediate panel. The holder may be integrally formed from molded plastic.

A window may be provided in the front panel. The window is an aperture in the front panel. The aperture exposes components (e.g., a microphone) of a held smart phone. In one embodiment the aperture has a width of at least ½ of the front panel width and a length (height) of at least ½ of the front panel length (height).

The panels may be non-planar. For example, the front panel may be non-planar, with a front outward curve having a front vertex adjacent to a front terminal edge, a space between the front terminal edge and the intermediate panel is greater than a space between the front vertex of the front outward curve and the intermediate panel. As another example, the back panel may be non-planar, with a back outward curve having a back vertex adjacent to a back terminal edge, a space between the back terminal edge and the intermediate panel is greater than a space between the back vertex of the back outward curve and the intermediate panel.

The back panel may include a plurality of apertures sized to receive at least one attachment for securing the electronic device holder to a cart. A non-limiting example of such an attachment is a cable tie.

The intermediate panel includes a back surface facing the back panel, and may include: a generally horizontal flange projecting perpendicularly from the back surface of the back panel by at least 0.125 inches; a generally vertical flange extending upwardly from the generally horizontal flange by at least ¼-inch, with the generally horizontal flange including a co-planar tab extending outwardly from the generally horizontal flange and the co-planar tab having a width (side to side) of at least 0.125 inches and less than 1.25 inches.

The top edge of a section of the shopping cart (such as a seat back of a shopping cart) is received between the back panel and the intermediate panel. An electronic device may have a bottom edge received between the front panel and the intermediate panel, with a microphone of the electronic device exposed through the window of the front panel.

BRIEF DESCRIPTION OF THE DRAWINGS

The foregoing and other aspects, objects, features and advantages of the invention will become better understood with reference to the following description, appended claims, and accompanying drawings, where:

Figure 1:
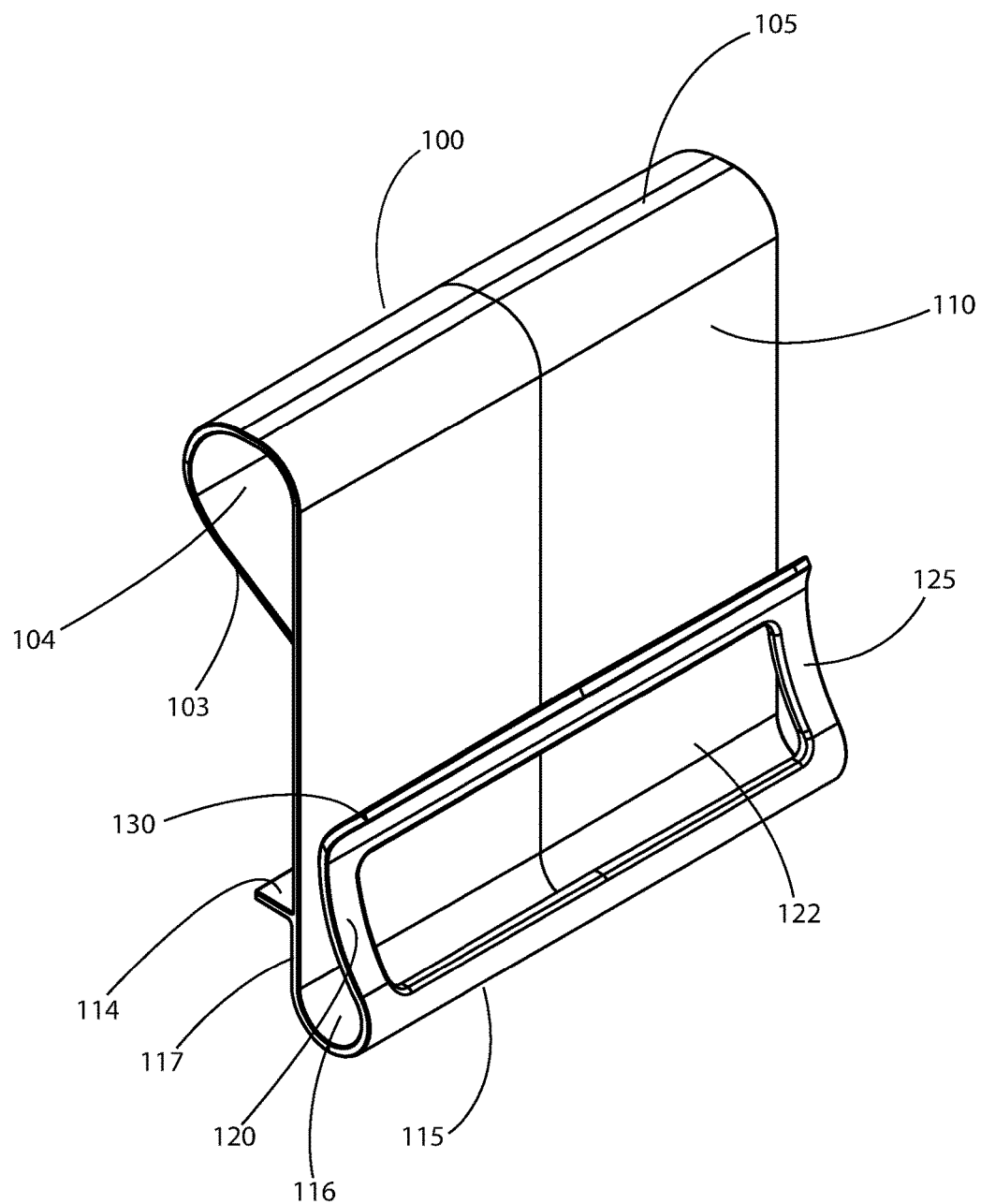
FIG. 1 is a front perspective view of an exemplary holder according to principles of the invention.
Figure 2:
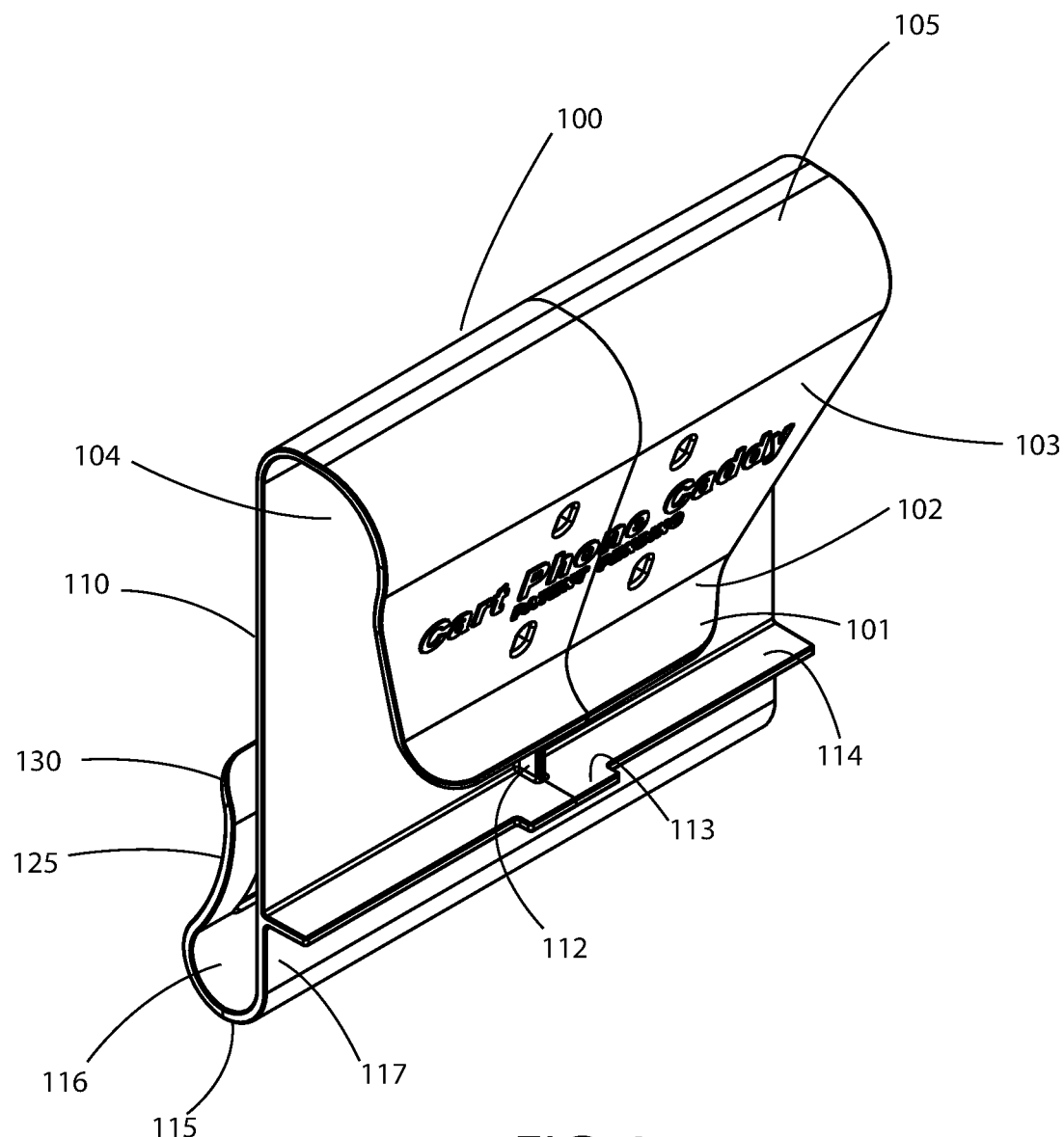
FIG. 2 is a back perspective view of an exemplary holder according to principles of the invention.
Figure 3:
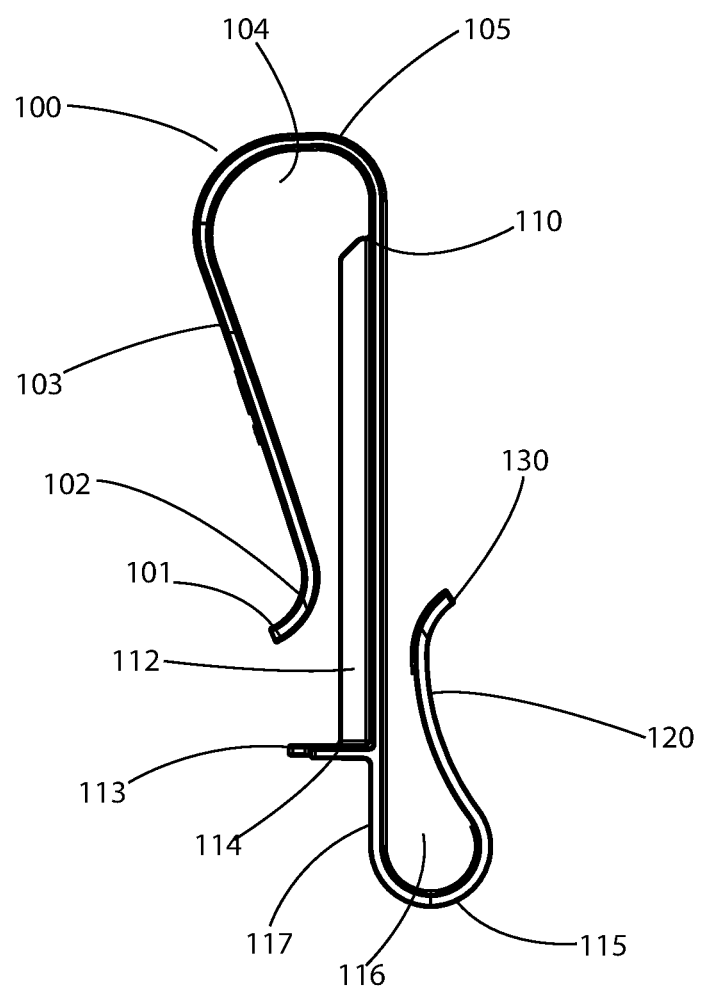
FIG. 3 is a profile view of an exemplary holder according to principles of the invention.
Figure 4:
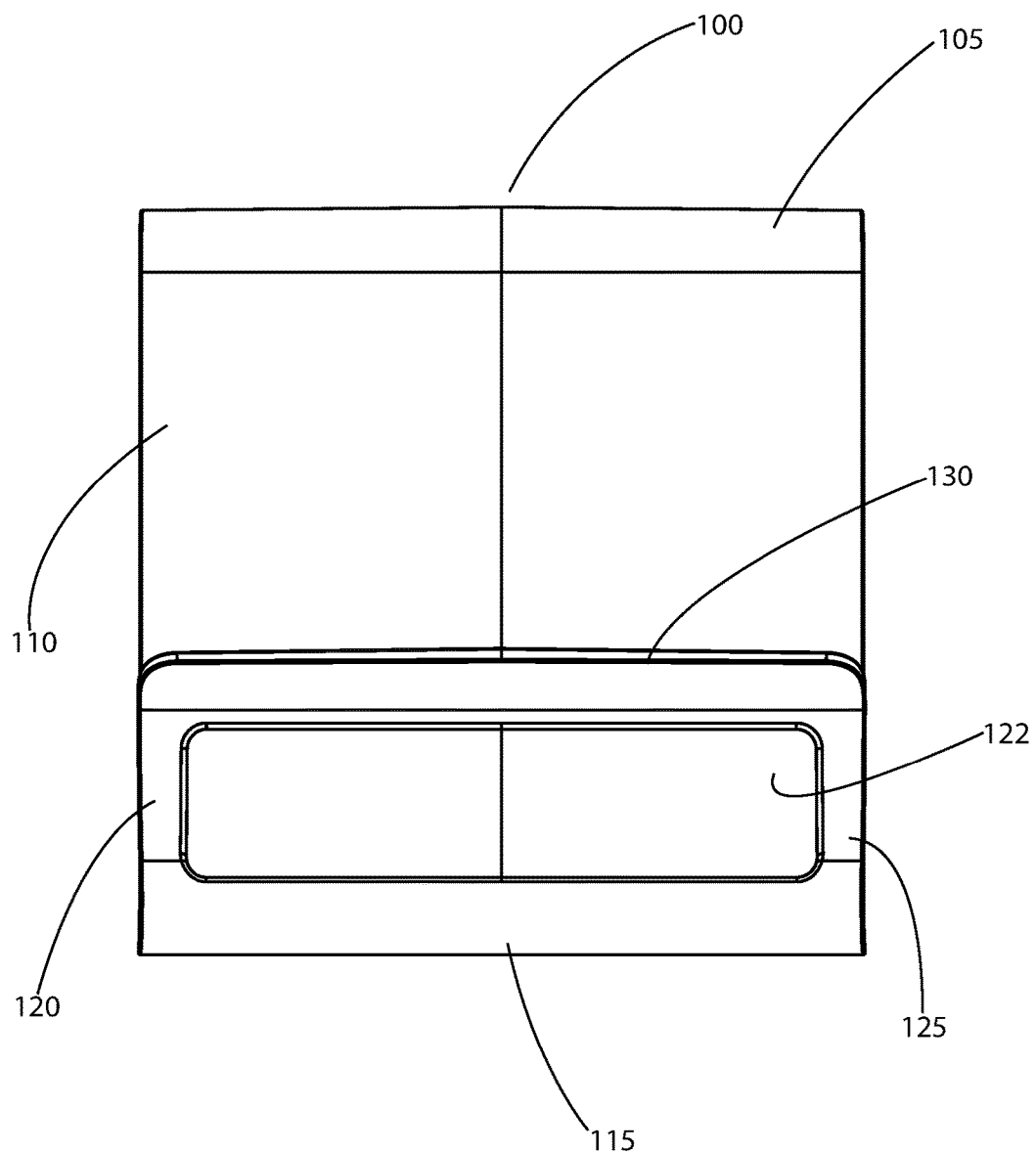
FIG. 4 is a front view of an exemplary holder according to principles of the invention.
Figure 5:
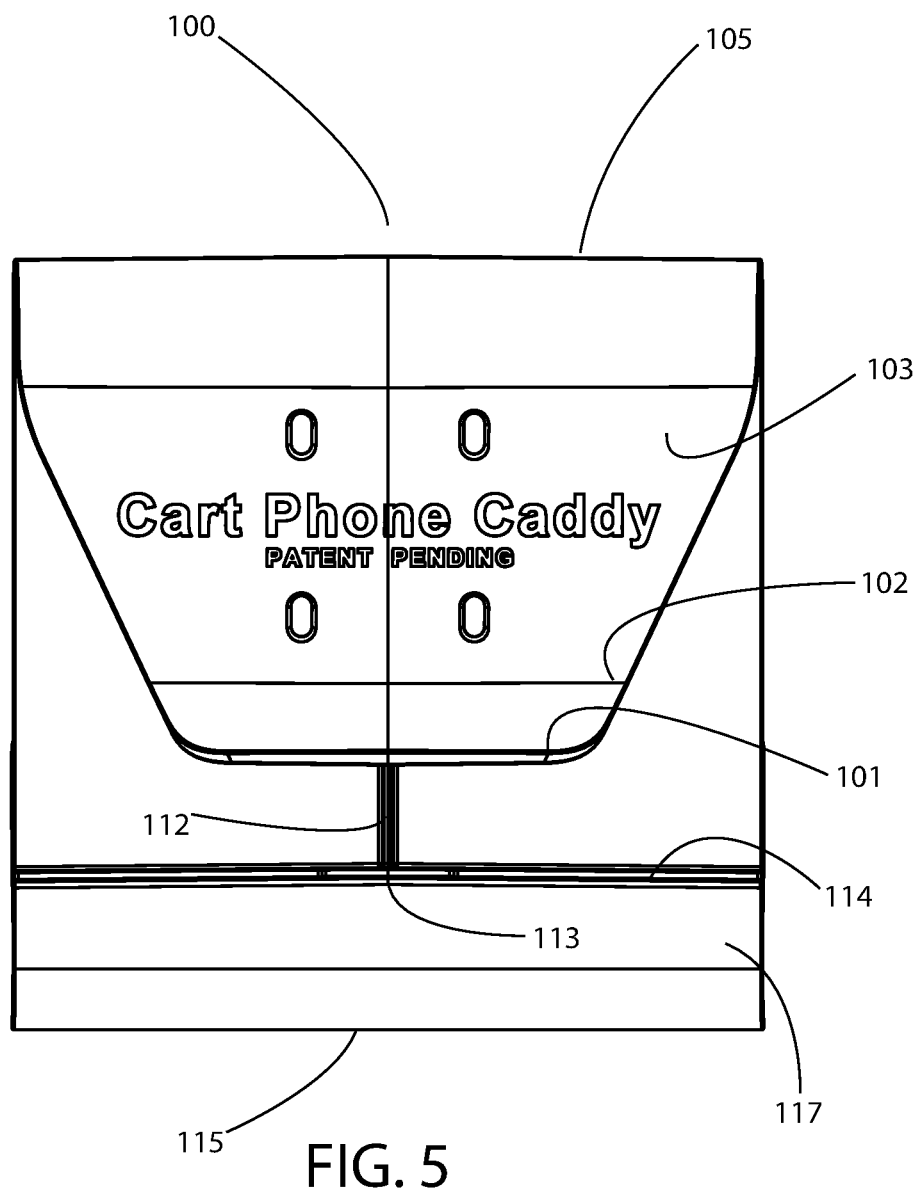
FIG. 5 is a back view of an exemplary holder mounted to a seat back of a shopping cart according to principles of the invention.
Figure 6:
FIG. 6 is a front perspective view of an exemplary holder with a phone mounted to a seat back of a shopping cart according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Referring to FIGS. 1 through 5, various view of an exemplary holder 100 according to principles of the invention are provided. The holder 100 comprises a generally S-shaped clip, having two bends 105, 115. The front bend 115 (aka holding bend 115) leads to a curved front panel 120 with a window (aperture) 122 and an outward curve 129 with a terminal end 130. The radius of the holding bend 115 is sufficient in size to define a space 116 for receiving an edge of a typical mobile phone. The sides 120, 125 and curve 129 hold the engaged edge of the phone against the intermediate panel 110, which extends between the holding bend 115 and the mounting bend 105. Each bend is at least 180°. The outward curve 129 and terminal end 130 facilitate sliding entry of an edge of a mobile phone into the holding space 116 defined by the holding bend 115.

The mounting bend 105 resides between the intermediate panel 110 and a back panel 103. The radius of the mounting bend 105 is sufficient in size to define a space 104 for receiving an edge of a seat back of a shopping cart, or a similar structure. The back panel 103 leads to an outward curve 102 with a terminal end 101. The outward curve 102 and terminal end 101 facilitate sliding entry of an edge of a cart structure into the mounting space 104 defined by the mounting bend 105. The mounting space 104 is suitable for mounting to metal wire shopping carts and plastic shopping carts, both of which are in widespread use.

As used herein, generally elastically deflectable means that a structure such as a panel deflects roughly in proportion to the spreading force applied, and when the spreading force is removed, the panel returns to its original undeflected position. The front panel and intermediate panel act as clamping jaws, with the front bend acting as a spring-like biasing means. Similarly, the back panel and intermediate panel act as clamping jaws, with the back bend acting as a spring-like biasing means. Each of the front panel and the back panel is generally elastically deflectable.

As used herein, the term panel broadly denotes a distinct portion of holder, which may be planar or non-planar. A panel, as used herein, is not limited to a planar surface. Thus, a panel may be curved or planar, within the scope of the invention.

A horizontal flange 114 extends from the back surface of the intermediate panel 110. The horizontal flange 114 abuts the structure of the cart that is engaged when the holder 100 is mounted to said structure. The flange 114 maintains the intermediate panel 110 and thus a held phone at a viewing angle, i.e., an angle that facilitates viewing of the screen of the held phone. A vertical flange 112 extends from and structurally reinforces the horizontal flange 114.

A tab 113 extends outwardly from the middle of the horizontal flange 114. The tab 113 has a width that is less than or about equal to the space between vertical wires of wire shopping cart. When the holder 100 is properly mounted to a cart, the tab 113 projects into the space between adjacent parallel vertical wires. In this manner, the tab 113 prevents unintended side-to-side sliding motion of the holder 100.

The height of the holder from the mounting bend to the holding bend is preferably about 3 to 5 inches, and more preferably about 3.8 inches, and even more preferably about 3.794 inches. The width of the holder from side to side is preferably about 3 to 5 inches, and more preferably about 3.75 inches, and even more preferably about 3.7 inches. The depth of the holder from the front outermost portion of the holding bend 115 to the terminal end 101 of the back panel 103 is preferably about 0.75 to 2.0 inches, and more preferably about 1 inches, and even more preferably about 1.1996 inches. As these are exemplary dimensions, they do not limit the invention.

The back panel 103 includes a plurality of mounting apertures 106. Four are illustrated in the Figures, though the invention is not limited to four mounting apertures. The apertures 106 allow securing the holder 100 to a cart with a wire, cable tie, tether or other flexible means of fastening. Such fasteners may secure the holder to vertical and or horizontal wires of cart that are between the back panel 103 and intermediate panel 110 when the holder 100 is installed.

Figure 7:
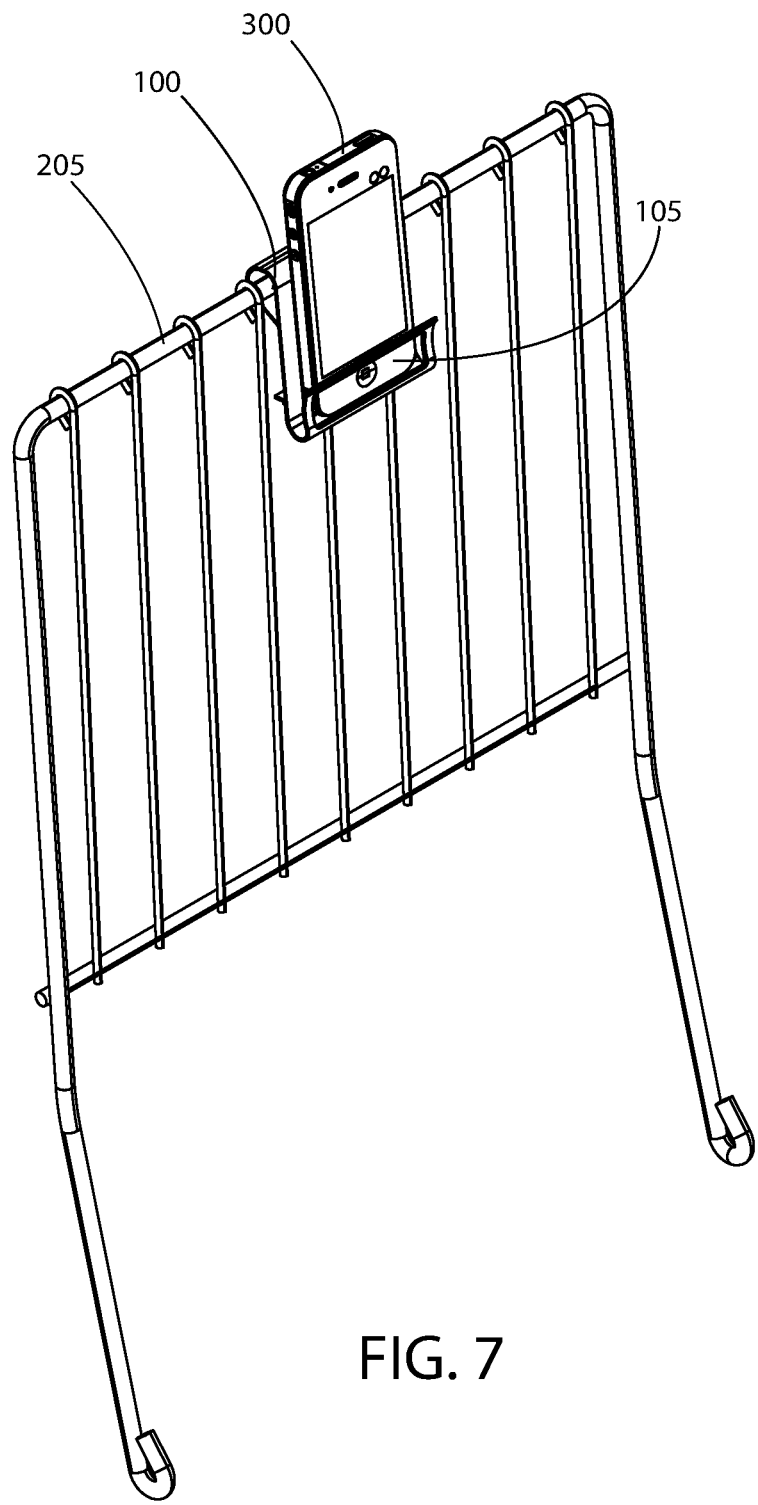
FIG. 7 is a front perspective view of an exemplary holder with a phone mounted to a seat back according to principles of the invention.
Figure 8:
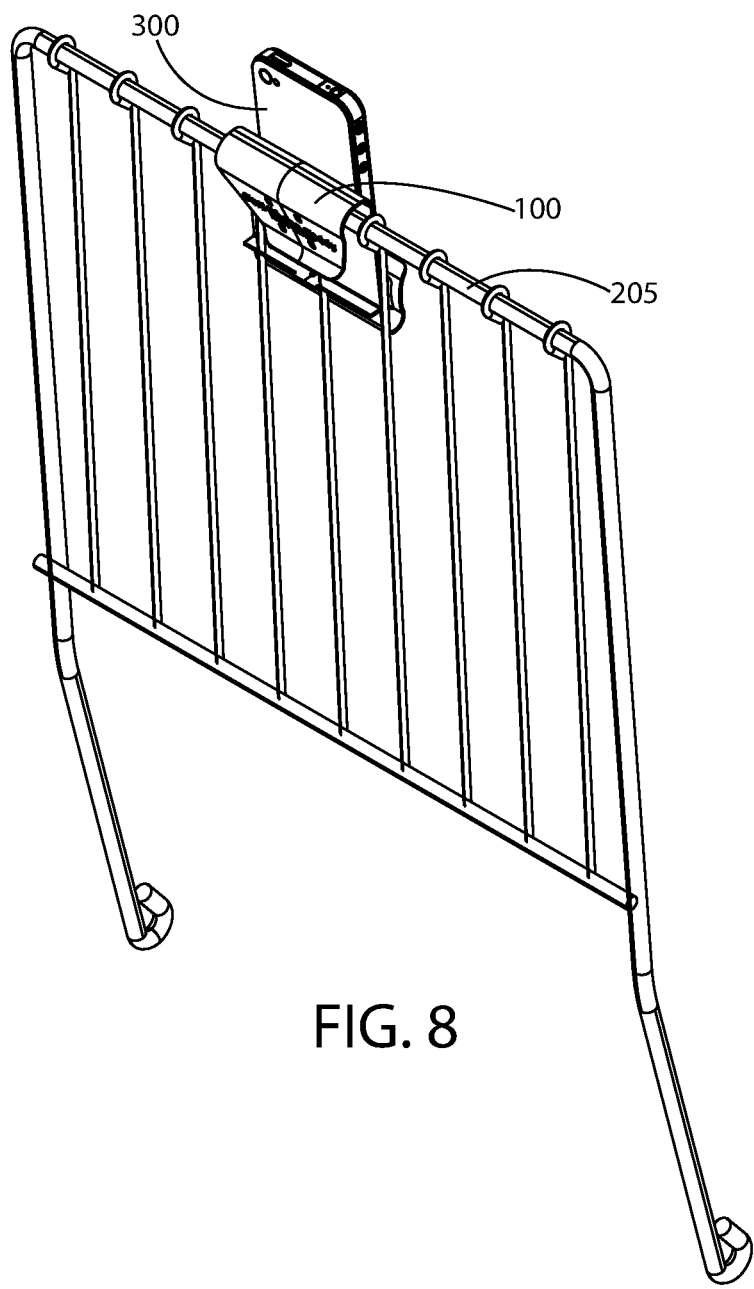
FIG. 8 is a back perspective view of an exemplary holder with a phone mounted to a seat back according to principles of the invention.
Figure 9:
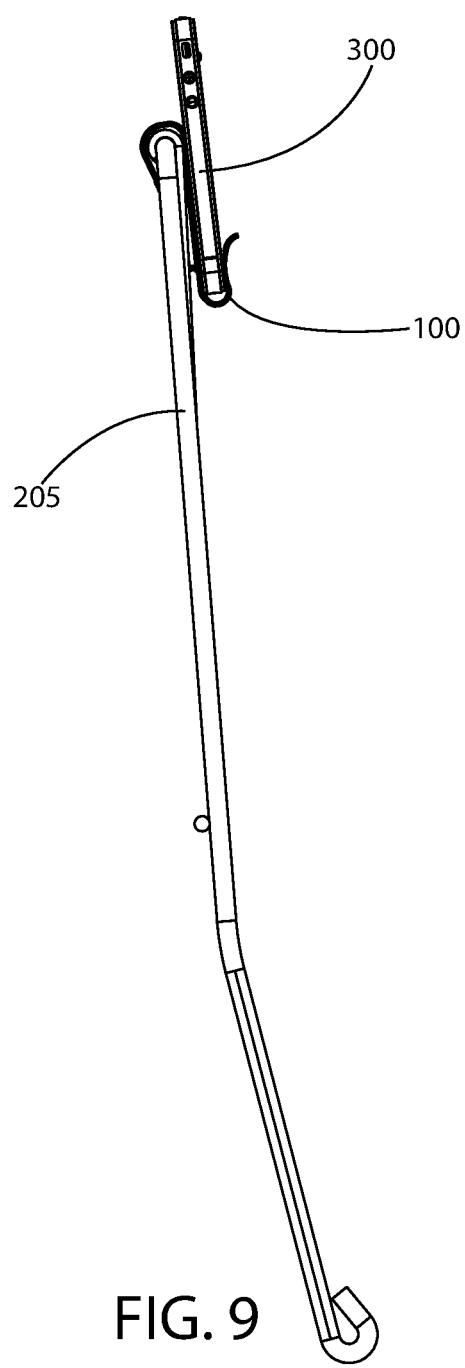
FIG. 9 is a profile view of an exemplary holder with a phone mounted to a seat back according to principles of the invention.

FIGS. 6 through 9 provide various views of the exemplary holder 100 mounted to a seat back 205 of a shopping cart 200 according to principles of the invention. The mounting bend 105 engages the top edge of the seat back 205. The flange 114 maintains the holder 100 at a viewing angle relative to the seat back 205. In FIGS. 7 through 9 the holder 100 is shown on the seat back 205 without the other portions of the cart 200, to improve clarity.

A phone 300 is held in the holder 100. The bottom edge of the phone 300 is engaged in the holding space 116. The phone 300 is clamped against the intermediate panel 110, by the holding bend and front panel 120. The window 122, a generally rectangular aperture, exposes components of the phone 300 adjacent to the bottom edge of the phone, such as a microphone of the phone 300. Thus, the holder 100 with the window 122 does not hinder utility, such as voice command, of the phone 300. The microphone and/or control or home button of the phone 300 remain exposed by and accessible through the window 122.

While a metal wire cart 200 and seat back are shown, the invention is not limited to use with such carts. Rather the invention may be used with other carts, including carts having different shapes and proportions, and carts comprised of other materials (e.g., plastics) with the same or different dimensions. The holder may be used on nearly any structure that includes an edge that can be received in the mounting space 104.

The intermediate panel 110 and/or front of the holding bend 115 and/or back panel 103 provide surfaces for displaying advertising. The advertising may be applied to such surfaces by printing, embossing, debossing, painting, adhered coverings (e.g., decals) or any other process or means for applying visible messages or artwork to a product during or after manufacturing.

The holder 100 may be comprised of any material that exhibits sufficient rigidity and strength, with flexibility and resiliency, to support a phone. By way of example and not limitation, the holder 100 may be comprised of metal such as steel, stainless steel, aluminum, an alloy or some other metal, which may be coated (e.g., anodized and/or painted or powder coated or resin coated) to resist corrosion, to prevent damage to the rod and reel, and to maintain good aesthetics. The metal must be flexible, such as spring steel, to provide clamping action.

Alternatively, the holder 100 may be fabricated using plastic by any suitable plastic forming technique. For example, the holder 100 may be integrally formed and comprised of a plastic or polymeric material, such as polyvinyl chloride (PVC), nylon, polysulfone, polyethylene, polypropylene, polystyrene, acrylics, cellulosics, acrylonitrile-butadiene-styrene (ABS) terpolymers, urethanes, thermo-plastic resins, thermo-plastic elastomers (TPE), acetal resins, polyamides, polycarbonates and/or polyesters. Other suitable polymeric compositions are known to those familiar with the art and may also be used in accordance with the present invention. Preferably the chosen material is relatively inexpensive, produces a rigid, durable and strong product, is easy to use in manufacturing operations and results in an aesthetically acceptable product.

The material may further include additives to provide desired properties such as desired colors, structural characteristics, glow-in-the dark properties and thermal reactivity (e.g., color changes according to heat). Optionally, an antimicrobial additive may be incorporated with plastic resins during compounding or as a masterbatch during molding and provide a biocide treatment to control microbes. One non-limiting example of an antimicrobial additive is a silver-based additive, often comprised of small (e.g., 25 nm diameter) silver particles. As another example, phosphorescent polymer additives, such as aluminate based phosphors, may be added to adsorb light energy and continue to release that energy as visible light, after the energy source is removed. Advantageously, such an embodiment provides a glow-in-the-dark holder that is easy to locate at night.

The holder 100 may be produced using any suitable manufacturing techniques known in the art for the chosen material, such as (for example) injection, compression, structural foam, blow, or transfer molding; polyurethane foam processing techniques; vacuum forming; casting; milling; and extrusion. Preferably the manufacturing technique is suitable for mass production at relatively low cost per unit, and results in an aesthetically acceptable product with a consistent acceptable quality and structural characteristics.

In sum, an electronic device holder 100 according to principles of the invention is mountable on a shopping cart, such as a seat back of a shopping cart. The electronic device holder includes a generally S-shaped clip with a front bend 115 disposed between a front panel 120 and an intermediate panel 110. The front bend 115 has a front bend 115 radius and is at least a 180° bend and less than a 270° bend. Preferably, the front panel 120 is angled towards the intermediate panel 110 by the front bend 115. The front panel 120 extends upwardly from the front bend 115 by a front panel 120 length (height). The intermediate panel 110 extends from the front bend 115 to a mounting bend 105 at an intermediate panel 110 length (height). The intermediate panel 110 length is greater than the front panel 120 length. The front panel 120 is generally elastically deflectable away from the intermediate panel 110 to provide at least a ¼-inch space between the front panel 120 and the intermediate panel 110. The mounting bend 105 has a mounting bend 105 radius and is at least a 180° bend and less than a 270° bend. A back panel 103 extends downwardly from the mounting bend 105. Preferably, the back panel 103 is angled toward the intermediate panel 110 by the mounting bend 105. The intermediate panel 110 is disposed between the back panel 103 and the front panel 120 and between the front bend 115 and the mounting bend 105. The back panel 103 is generally elastically deflectable away from the intermediate panel 110 to provide at least a ¼-inch space between the back panel 103 and the intermediate panel 110. The holder 100 may be integrally formed from molded plastic.

A window 122 may be provided in the front panel 120. The window 122 is an aperture in the front panel 120. The aperture exposes components (e.g., a microphone) of a held smart phone. In one embodiment the aperture has a width of at least ½ of the front panel 120 width and a length (height) of at least ½ of the front panel 120 length (height).

The panels may be non-planar. For example, the front panel 120 may be non-planar, with a front outward curve having a front vertex adjacent to a front terminal edge, a space between the front terminal edge and the intermediate panel 110 is greater than a space between the front vertex of the front outward curve and the intermediate panel 110. As another example, the back panel 103 may be non-planar, with a back outward curve having a back vertex adjacent to a back terminal edge, a space between the back terminal edge and the intermediate panel 110 is greater than a space between the back vertex of the back outward curve and the intermediate panel 110.

The back panel 103 may include a plurality of apertures sized to receive at least one attachment for securing the electronic device holder to a cart. A non-limiting example of such an attachment is a cable tie.

The intermediate panel 110 includes a back surface facing the back panel 103, and may include: a generally horizontal flange 114 projecting perpendicularly from the back surface of the back panel 103 by at least 0.125 inches; a generally vertical flange 112 extending upwardly from the generally horizontal flange 114 by at least ¼-inch, with the generally horizontal flange 114 including a co-planar tab 113 extending outwardly from the generally horizontal flange 114 and the co-planar tab 113 having a width (side to side) of at least 0.125 inches and less than 1.25 inches.

The top edge of a section of the shopping cart 200 (such as a seat back 205 of a shopping cart 200) is received and clamped between the back panel 103 and the intermediate panel 110. An electronic device may have a bottom edge received between the front panel 120 and the intermediate panel 110, with a microphone of the electronic device exposed through the window 122 of the front panel 120.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An electronic device holder mountable on a shopping cart, the electronic device holder comprising:
a generally S-shaped clip including a front bend disposed between a front panel and an intermediate panel, the front bend having a front bend radius and being at least a 180° bend and less than a 270° bend;
the front panel angled towards the intermediate panel by the front bend, the front panel extending upwardly from the front bend by a front panel length,
the intermediate panel extending from the front bend to a mounting bend at an intermediate panel length, the intermediate panel length being greater than the front panel length,
the front panel being generally elastically deflectable away from the intermediate panel to provide at least a ¼-inch space between the front panel and the intermediate panel, the mounting bend having a mounting bend radius and being at least a 180° bend and less than a 270° bend,
a back panel extending downwardly from the mounting bend, the back panel being angled toward the intermediate panel by the mounting bend, the intermediate panel being disposed between the back panel and the front panel and between the front bend and the mounting bend, the back panel being generally elastically deflectable away from the intermediate panel to provide at least a ¼-inch space between the back panel and the intermediate panel, and
a window in the front panel, the window comprising an aperture in the front panel.

2. The electronic device holder of claim 1, the front panel having a front panel width and the aperture in the front panel having a width of at least ½ of the front panel width and having a length of at least ½ of the front panel length.

3. The electronic device holder of claim 2, the front panel being non-planar and including a front outward curve having a front vertex adjacent to a front terminal edge, a space between the front terminal edge and the intermediate panel being greater than a space between the front vertex of the front outward curve and the intermediate panel.

4. The electronic device holder of claim 1, the front panel being non-planar and including a front outward curve having a front vertex adjacent to a front terminal edge, a space between the front terminal edge and the intermediate panel being greater than a space between the front vertex of the front outward curve and the intermediate panel.

5. The electronic device holder of claim 1, the back panel being non-planar and including a back outward curve having a back vertex adjacent to a back terminal edge, a space between the back terminal edge and the intermediate panel being greater than a space between the back vertex of the back outward curve and the intermediate panel.

6. The electronic device holder of claim 1, the back panel including a plurality of apertures sized to receive at least one attachment for securing the electronic device holder to a cart.

7. The electronic device holder of claim 6, the at least one attachment comprising a cable tie.

8. An electronic device holder mountable on a shopping cart, the electronic device holder comprising:
a generally S-shaped clip including a front bend disposed between a front panel and an intermediate panel, the front bend having a front bend radius and being at least a 180° bend and less than a 270° bend;
the front panel angled towards the intermediate panel by the front bend, the front panel extending upwardly from the front bend by a front panel length,
the intermediate panel extending from the front bend to a mounting bend at an intermediate panel length, the intermediate panel length being greater than the front panel length,
the front panel being generally elastically deflectable away from the intermediate panel to provide at least a ¼-inch space between the front panel and the intermediate panel, the mounting bend having a mounting bend radius and being at least a 180° bend and less than a 270° bend,
a back panel extending downwardly from the mounting bend, the back panel being angled toward the intermediate panel by the mounting bend, the intermediate panel being disposed between the back panel and the front panel and between the front bend and the mounting bend, the back panel being generally elastically deflectable away from the intermediate panel to provide at least a ¼-inch space between the back panel and the intermediate panel, and
the intermediate panel including a back surface facing the back panel, and a generally horizontal flange projecting perpendicularly from the back surface of the back panel by at least 0.125 inches.

9. The electronic device holder of claim 8, the intermediate panel further including a generally vertical flange projecting perpendicularly from the back surface of the back panel by at least 0.125 inches, the generally vertical flange extending upwardly from the generally horizontal flange by at least ¼-inch.

10. The electronic device holder of claim 8, the generally horizontal flange including a co-planar tab extending outwardly from the generally horizontal flange, the co-planar tab having a width of at least 0.125 inches and less than 1.25 inches.

11. The electronic device holder of claim 3, the back panel being non-planar and including a back outward curve having a back vertex adjacent to a back terminal edge, a space between the back terminal edge and the intermediate panel being greater than a space between the back vertex of the back outward curve and the intermediate panel.

12. The electronic device holder of claim 11, the back panel including a plurality of apertures sized to receive at least one attachment for securing the electronic device holder to a cart.

13. The electronic device holder of claim 12, the at least one attachment comprising a cable tie.

14. The electronic device holder of claim 13, the intermediate panel including a back surface facing the back panel, and a generally horizontal flange projecting perpendicularly from the back surface of the back panel by at least 0.125 inches.

15. The electronic device holder of claim 14, the intermediate panel further including a generally vertical flange projecting perpendicularly from the back surface of the back panel by at least 0.125 inches, the generally vertical flange extending upwardly from the generally horizontal flange by at least ¼-inch.

16. The electronic device holder of claim 15, the generally horizontal flange including a co-planar tab extending outwardly from the generally horizontal flange, the co-planar tab having a width of at least 0.125 inches and less than 1.25 inches.

17. A shopping cart equipped with an electronic device holder, the shopping cart having a section with a top edge on which the electronic device holder is mounted, the electronic device holder comprising:

a generally S-shaped clip including a front bend disposed between a front panel and an intermediate panel, the front bend having a front bend radius and being at least a 180° bend and less than a 270° bend;

the front panel angled towards the intermediate panel by the front bend, the front panel extending upwardly from the front bend by a front panel length, the intermediate panel extending from the front bend to a mounting bend at an intermediate panel length, the intermediate panel length being greater than the front panel length, the front panel being generally elastically deflectable away from the intermediate panel to provide at least a ¼-inch space between the front panel and the intermediate panel, the mounting bend having a mounting bend radius and being at least a 180° bend and less than a 270° bend, a back panel extending downwardly from the mounting bend, the back panel being angled toward the intermediate panel by the mounting bend, the intermediate panel being disposed between the back panel and the front panel and between the front bend and the mounting bend, the back panel being generally elastically deflectable away from the intermediate panel to provide at least a ¼-inch space between the back panel and the intermediate panel; and the top edge of the section of the shopping cart being received between the back panel and the intermediate panel, a window in the front panel, the window comprising an aperture in the front panel, and an electronic device having a bottom edge received between the front panel and the intermediate panel, the electronic device having a microphone adjacent to the bottom edge, and the window exposing the microphone.

* * * * *